US012472752B2

(12) United States Patent
Kanahara

(10) Patent No.: US 12,472,752 B2
(45) Date of Patent: Nov. 18, 2025

(54) FLOW PATH UNIT AND LIQUID EJECTION DEVICE

(71) Applicant: SEIKO EPSON CORPORATION, Tokyo (JP)

(72) Inventor: Shunsuke Kanahara, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/183,397

(22) Filed: Mar. 14, 2023

(65) Prior Publication Data

US 2023/0294414 A1 Sep. 21, 2023

(30) Foreign Application Priority Data

Mar. 16, 2022 (JP) ................................ 2022-041335

(51) Int. Cl.
*B41J 2/19* (2006.01)
*B41J 2/175* (2006.01)

(52) U.S. Cl.
CPC ................ *B41J 2/19* (2013.01); *B41J 2/175* (2013.01)

(58) Field of Classification Search
CPC .................................. B41J 2/19; B41J 2/175
See application file for complete search history.

(56) References Cited

U.S. PATENT DOCUMENTS

2010/0053285 A1 3/2010 Ito
2013/0141502 A1* 6/2013 Kobayashi .......... B41J 2/17563 347/92
2015/0224786 A1 8/2015 Otsuka et al.
2017/0304747 A1* 10/2017 Xiang ....................... C02F 1/20
2019/0084314 A1* 3/2019 Yamaguchi ............. B41J 2/175

FOREIGN PATENT DOCUMENTS

JP 2010-058324 A 3/2010
JP 2018-108741 A 7/2018

* cited by examiner

*Primary Examiner* — Yaovi M Ameh
(74) *Attorney, Agent, or Firm* — Workman Nydegger

(57) ABSTRACT

A flow path unit including a flow path through which a liquid supplied to an ejection unit that ejects the liquid flows includes a removal unit configured to remove a gas. The removal unit includes an inner wall that is provided with an opening in communication with the flow path and that is configured to come into contact with the liquid, and a storage tank including the inner wall and configured to store the liquid. The removal unit removes the gas contained in the liquid flowing through the flow path in the storage tank. The removal unit includes, at a position coming into contact with the liquid in the storage tank, a lyophobic member having a lower lyophilic property with respect to the liquid than that of the inner wall.

9 Claims, 11 Drawing Sheets

FLOW PATH UNIT AND LIQUID EJECTION DEVICE

The present application is based on, and claims priority from JP Application Serial Number 2022-041335, filed Mar. 16, 2022, the disclosure of which is hereby incorporated by reference herein in its entirety.

BACKGROUND

1. Technical Field

The present disclosure relates to a flow path unit and a liquid ejection device.

2. Related Art

In a related art, a flow path unit that supplies a liquid to an ejection unit that ejects the liquid has been used. Among such flow path units, there is a flow path unit including a removal unit for removing a gas contained in the liquid flowing through a flow path. For example, JP-A-2018-108741 discloses a liquid ejection device that includes a decompression chamber accommodating a cylindrical hollow fiber membrane and that removes a gas contained in a liquid flowing through a flow path by the liquid passing through the decompression chamber.

However, in the known flow path unit including the removal unit for removing the gas contained in the liquid flowing through the flow path, it is difficult to appropriately remove the gas contained in the liquid flowing through the flow path. For example, in the liquid ejection device disclosed in JP-A-2018-108741, there is a possibility that the gas may adhere as bubbles to a portion such as a hollow fiber membrane coming into contact with the liquid, and the bubbles adhering to the portion coming into contact with the liquid may grow without moving and may flow out into the flow path.

SUMMARY

A flow path unit according to the present disclosure for solving the above problem is a flow path unit including a flow path through which a liquid supplied to an ejection unit that ejects the liquid flows, the flow path unit including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the removal unit includes, at a position coming into contact with the liquid in the storage tank, a lyophobic member having a lower lyophilic property with respect to the liquid than that of the inner wall.

Further, a flow path unit according to the present disclosure for solving the above problem is a flow path unit including a flow path through which a liquid supplied to an ejection unit that ejects the liquid flows, the flow path unit including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the inner wall includes, at a position coming into contact with the liquid in the storage tank, a lyophobic region having a lower lyophilic property with respect to the liquid than that of an adjacent region adjacent to the opening.

Further, a liquid ejection device according to the present disclosure for solving the above problem is a liquid ejection device including an ejection unit configured to eject a liquid, and a flow path through which the liquid supplied to the ejection unit flows, the liquid ejection device including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the removal unit includes, at a position coming into contact with the liquid in the storage tank, a lyophobic member having a lower lyophilic property with respect to the liquid than that of the inner wall.

Further, a liquid ejection device according to the present disclosure for solving the above problem is a liquid ejection device including an ejection unit configured to eject a liquid, and a flow path through which the liquid supplied to the ejection unit flows, the liquid ejection device including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the inner wall includes, at a position coming into contact with the liquid in the storage tank, a lyophobic region having a lower lyophilic property with respect to the liquid than that of an adjacent region adjacent to the opening.

DESCRIPTION OF EXEMPLARY EMBODIMENTS

Figure 1:
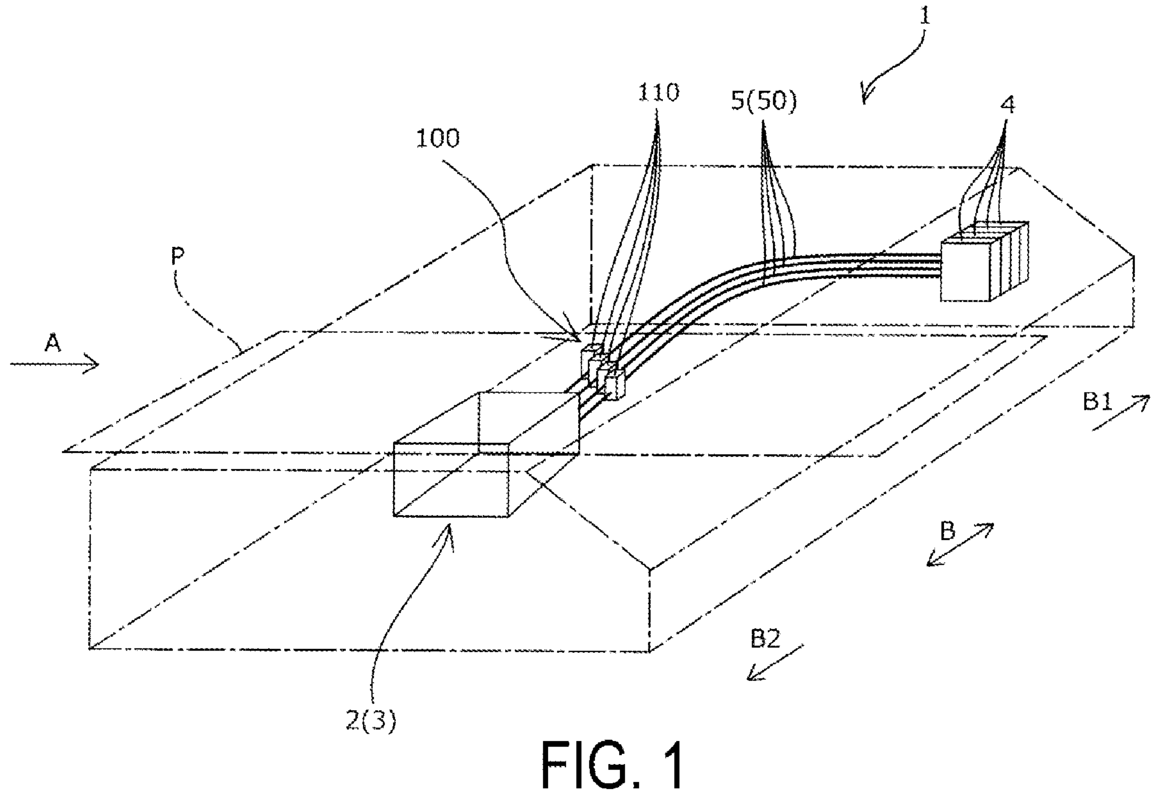
FIG. 1 is a schematic perspective view illustrating a liquid ejection device according to Embodiment 1 of the present disclosure.

First, the present disclosure will be schematically described.

A flow path unit according to a first aspect of the present disclosure for solving the above problem is a flow path unit including a flow path through which a liquid supplied to an ejection unit that ejects the liquid flows, the flow path unit including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the removal unit includes, at a position coming into contact with the liquid in the storage tank, a lyophobic member having a lower lyophilic property with respect to the liquid than that of the inner wall.

According to this aspect, the removal unit includes the lyophobic member at a position coming into contact with the liquid in the storage tank. As the lyophilic property of a contact surface with respect to the liquid decreases, the gas contained in the liquid is more likely to appear as bubbles on the contact surface. Therefore, the gas contained in the liquid can be caused to appropriately appear as bubbles due to the lyophobic member. Therefore, it is possible to appropriately remove the gas contained in the liquid flowing through the flow path.

According to a flow path unit of a second aspect of the present disclosure, in the first aspect, the removal unit includes, above the lyophobic member in a direction of gravity, a recovery unit configured to recover a bubble desorbed from the liquid.

According to this aspect, the recovery unit that recovers the bubbles desorbed from the liquid is included above the lyophobic member in the direction of gravity. Therefore, the bubbles reaching the flow path can be suppressed by recovering the bubbles that have appeared due to the lyophobic member.

According to a flow path unit of a third aspect of the present disclosure, in the first or second aspect, at least one heating unit configured to heat the liquid stored in the storage tank is provided.

According to this aspect, the heating unit that heats the liquid stored in the storage tank is provided. Since the gas contained in the liquid can be efficiently turned into bubbles by heating the liquid, the gas contained in the liquid flowing through the flow path can be efficiently removed.

According to a flow path unit of a fourth aspect of the present disclosure, in the third aspect, the at least one heating unit includes a first heating unit provided on the inner wall and a second heating unit provided on the lyophobic member.

According to this aspect, the removal unit includes the first heating unit provided in the inner wall and the second heating unit provided in the lyophobic member as the heating unit. Therefore, it is possible to remove the gas contained in the liquid particularly efficiently in the storage tank.

According to a flow path unit of a fifth aspect of the present disclosure, in any one of the first to fourth aspects, an ultrasonic wave applying unit configured to apply an ultrasonic wave to the liquid stored in the storage tank is provided.

According to this aspect, the ultrasonic wave applying unit that applies ultrasonic waves to the liquid stored in the storage tank is provided. Since the gas contained in the liquid can be efficiently turned into bubbles by applying ultrasonic waves to the liquid, the gas contained in the liquid flowing through the flow path can be efficiently removed.

According to a flow path unit of a sixth aspect of the present disclosure, in the fifth aspect, the ultrasonic wave applying unit is provided in the lyophobic member.

According to this aspect, the ultrasonic wave applying unit is provided in the lyophobic member. Therefore, it is possible to remove the gas contained in the liquid particularly efficiently in the storage tank.

According to a flow path unit of a seventh aspect of the present disclosure, in any one of the first to sixth aspects, the storage tank includes, on an upper side in a direction of gravity, a reservoir portion in which the gas removed from the liquid is accumulated, and the lyophobic member extends to the reservoir portion.

When the entire lyophobic member is located in the liquid, the bubbles adhering to the lyophobic member are likely to move upward in the direction of gravity along the lyophobic member, but are less likely to separate from an upper end of the lyophobic member in the direction of gravity. On the other hand, according to this aspect, the lyophobic member extends to the reservoir portion in which the gas is accumulated. With such a configuration, the bubbles adhering to the lyophobic member can be efficiently moved to the air reservoir, and thus the bubbles reaching the flow path can be suppressed.

A flow path unit of an eighth aspect of the present disclosure is a flow path unit including a flow path through which a liquid supplied to an ejection unit that ejects the liquid flows, the flow path unit including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the inner wall includes, at a position coming into contact with the liquid in the storage tank, a lyophobic region having a lower lyophilic property with respect to the liquid than that of an adjacent region adjacent to the opening.

According to this aspect, the inner wall includes, at a position coming into contact with the liquid in the storage tank, the lyophobic region having a lower lyophilic property with respect to the liquid than that of the adjacent region. Since the gas contained in the liquid is more likely to appear as bubbles on a contact surface as the lyophilic property of the contact surface with respect to the liquid decreases, the gas contained in the liquid can be appropriately caused to appear as bubbles due to the lyophobic region. Therefore, it is possible to appropriately remove the gas contained in the liquid flowing through the flow path.

According to a flow path unit of a ninth aspect of the present disclosure, in the eighth aspect, the removal unit includes, above the lyophobic region in a direction of gravity, a recovery unit configured to recover the gas removed from the liquid.

According to this aspect, the recovery unit that recovers the bubbles desorbed from the liquid is included above the lyophobic region in the direction of gravity. Therefore, the bubbles reaching the flow path can be suppressed by recovering the bubbles that have appeared in the lyophobic region.

According to a flow path unit of a tenth aspect of the present disclosure, in the eighth or ninth aspect, a heating unit configured to heat the liquid stored in the storage tank is provided.

According to this aspect, the heating unit that heats the liquid stored in the storage tank is provided. Since the gas contained in the liquid can be efficiently turned into bubbles by heating the liquid, the gas contained in the liquid flowing through the flow path can be efficiently removed.

According to a flow path unit of an eleventh aspect of the present disclosure, in any one of the eighth to tenth aspects, an ultrasonic wave applying unit configured to apply an ultrasonic wave to the liquid stored in the storage tank is provided.

According to this aspect, the ultrasonic wave applying unit that applies ultrasonic waves to the liquid stored in the storage tank is provided. Since the gas contained in the liquid can be efficiently turned into bubbles by applying ultrasonic waves to the liquid, the gas contained in the liquid flowing through the flow path can be efficiently removed.

According to a flow path unit of a twelfth aspect of the present disclosure, in any one of the eighth to eleventh aspects, the storage tank includes, on an upper side in a direction of gravity, a reservoir portion in which the gas removed from the liquid is accumulated, and the lyophobic region is provided over an interface between the liquid stored in the storage tank and the gas accumulated in the reservoir portion.

When the entire lyophobic region is located in the liquid, the bubbles adhering to the lyophobic region are likely to move upward in the direction of gravity along the lyophobic region, but are unlikely to be separated from an upper end portion of the lyophobic region in the direction of gravity. On the other hand, according to this aspect, the lyophobic region is provided over the gas-liquid interface. With such a configuration, bubbles adhering to the lyophobic region can be efficiently moved to the air reservoir, and the bubbles reaching the flow path can be suppressed.

A liquid ejection device according to a thirteenth aspect of the present disclosure is a liquid ejection device including an ejection unit configured to eject a liquid, and a flow path through which the liquid supplied to the ejection unit flows, the liquid ejection device including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the removal unit includes, at a position coming into contact with the liquid in the storage tank, a lyophobic member having a lower lyophilic property with respect to the liquid than that of the inner wall.

According to this aspect, the removal unit includes the lyophobic member at a position coming into contact with the liquid in the storage tank. Therefore, the gas contained in the liquid can appropriately appear as bubbles due to the lyophobic member, and the gas contained in the liquid flowing through the flow path can be appropriately removed.

A liquid ejection device according to a fourteenth aspect of the present disclosure is a liquid ejection device including an ejection unit configured to eject a liquid, and a flow path through which the liquid supplied to the ejection unit flows, the liquid ejection device including a removal unit configured to remove a gas contained in the liquid flowing through the flow path, wherein the removal unit includes an inner wall that is provided with an opening in communication with the flow path and that is configured to come into contact with the liquid, and a storage tank including the inner wall and configured to store the liquid, the removal unit removes the gas in the storage tank, and the inner wall includes, at a position coming into contact with the liquid in the storage tank, a lyophobic region having a lower lyophilic property with respect to the liquid than that of an adjacent region adjacent to the opening.

According to this aspect, the inner wall includes, at a position coming into contact with the liquid in the storage tank, the lyophobic region having a lower lyophilic property with respect to the liquid than that of the adjacent region. Thus, the gas contained in the liquid can appropriately appear as bubbles due to the lyophobic region, and the gas contained in the liquid flowing through the flow path can appropriately be removed.

Embodiment 1

Hereinafter, a liquid ejection device according to one embodiment of the present disclosure will be described in detail with reference to the accompanying drawings. First, an overview of a liquid ejection device 1 according to Embodiment 1 of the present disclosure will be described.

The liquid ejection device 1 according to the embodiment performs recording on a medium P transported in a transport direction A by a transport unit (not illustrated) by reciprocating a carriage 2 including an ejection unit 3 that ejects ink on the side facing the medium P in a scanning direction B intersecting the transport direction A. Specifically, the medium P is intermittently driven in the transport direction A, the ejection unit 3 is reciprocated (reciprocal scanning) in the scanning direction B via the carriage 2, and ink is ejected from a plurality of nozzles (not illustrated) formed in the ejection unit 3 to perform recording. Here, one direction of the scanning directions B is referred to as a direction B1, and the other direction of the scanning directions B is referred to as a direction B2.

The ejection unit 3 of the embodiment is an inkjet head including a piezoelectric element. However, the present disclosure is not limited to such a configuration, and a thermal head including a heater may be used instead of the piezoelectric element. The carriage 2 is coupled to an ink cartridge 4 that stores black ink, cyan ink, magenta ink, and yellow ink via an ink tube 5 that constitutes a part of a flow path unit 100 and also constitutes a flow path 50 of the ink. The flow path unit 100 is provided on the side of the carriage 2 in the direction B1, and the detailed configuration of the flow path unit 100 will be described below. Then, the ejection unit 3 is capable of ejecting black ink, cyan ink, magenta ink, and yellow ink, and nozzle rows corresponding to the respective inks are formed in the transport direction A. The number of colors of ink is not limited to the four colors, may be more or less than four colors, or may be other colors.

Figure 2:
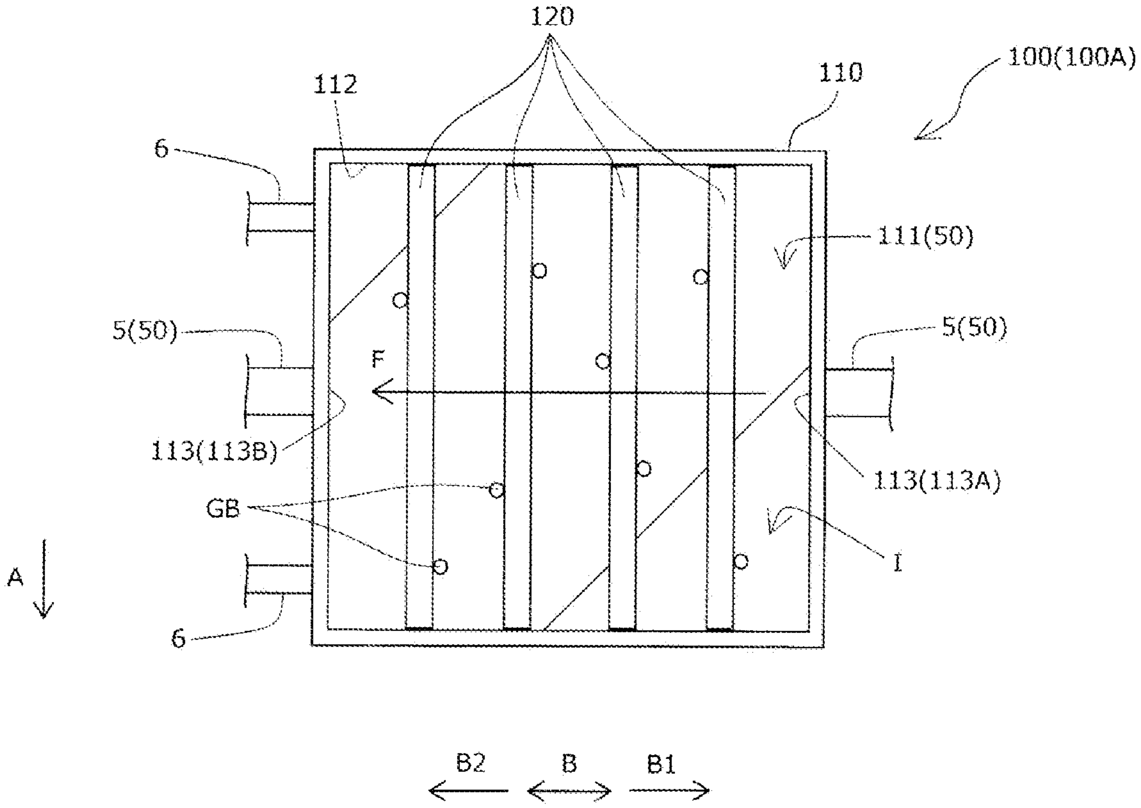
FIG. 2 is a schematic plan cross-sectional view illustrating a removal unit of a flow path unit of the liquid ejection device illustrated in FIG. 1.
Figure 3:
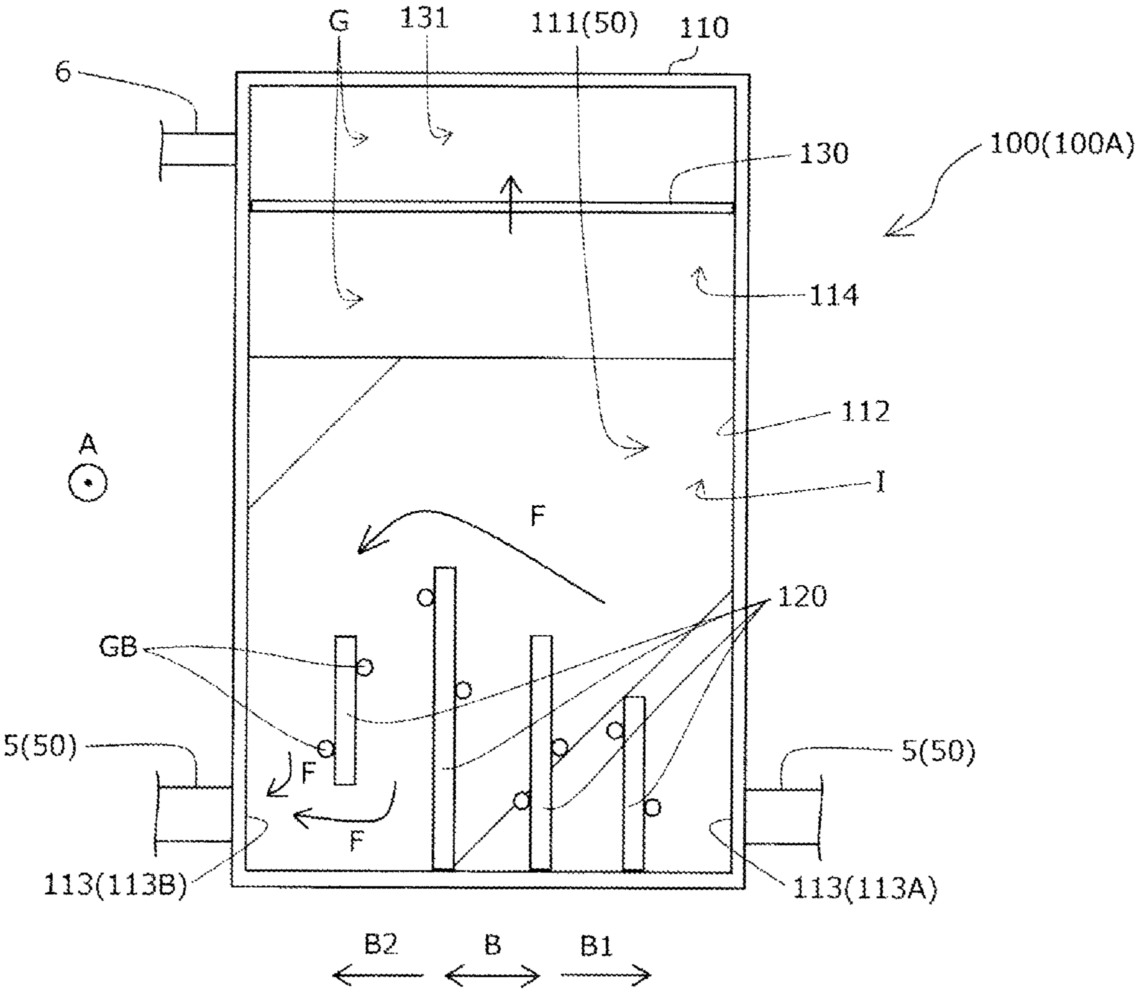
FIG. 3 is a schematic side cross-sectional view illustrating the removal unit of the flow path unit of the liquid ejection device of FIG. 1.
Figure 11:
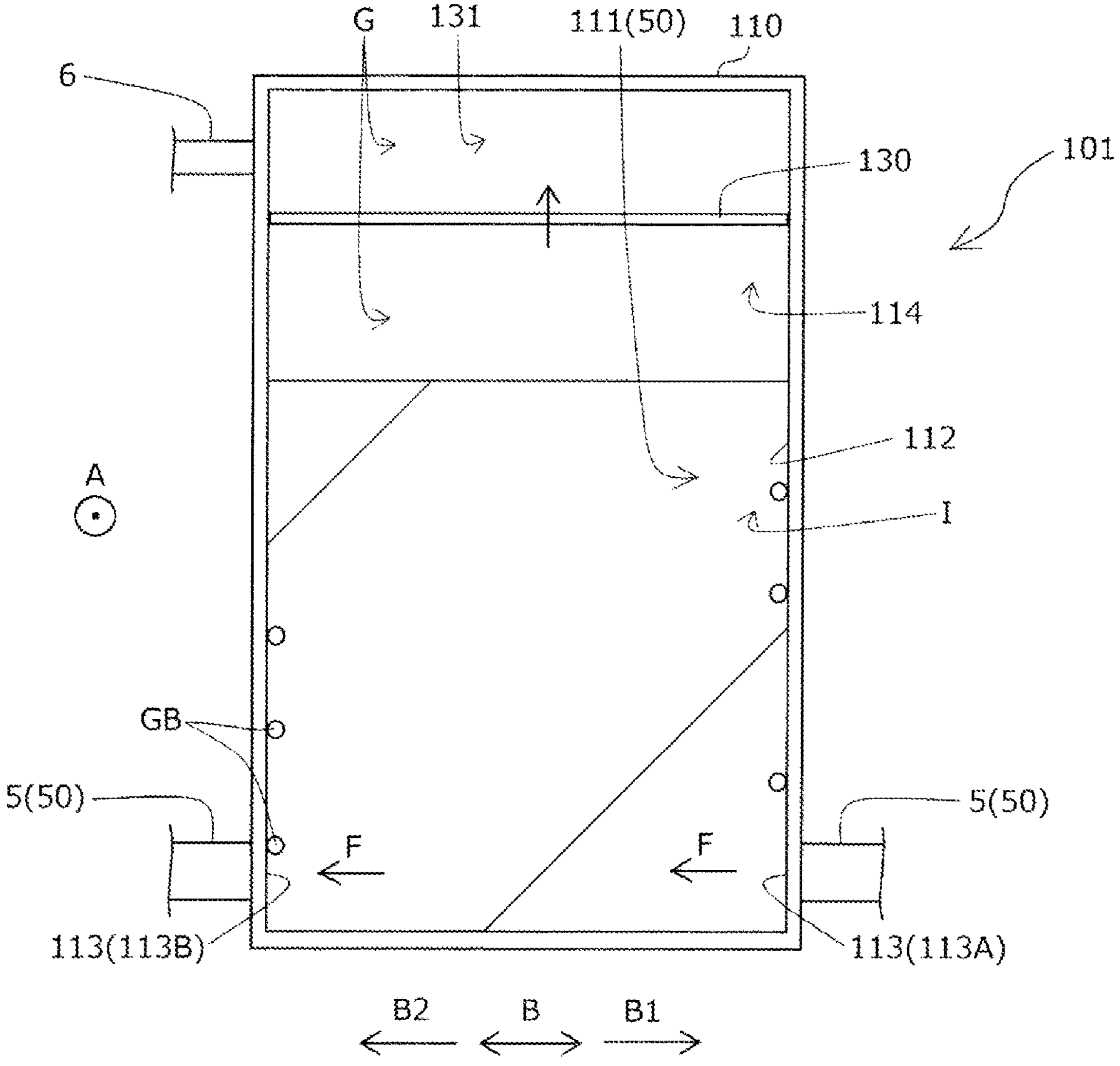
FIG. 11 is a schematic side cross-sectional view illustrating a removal unit of a flow path unit of a liquid ejection device according to a reference example.

Next, a detailed configuration of the flow path unit 100 (a flow path unit 100A) in the liquid ejection device 1 according to the embodiment will be described with reference to FIGS. 2 and 3 and FIG. 11 in addition to FIG. 1. As illustrated in FIG. 1, the flow path unit 100A of the embodiment is a flow path unit that supplies ink to the ejection unit 3 that ejects ink as a liquid. In addition, as illustrated in FIGS. 2 and 3, the flow path 50 through which an ink I flows and the removal unit 110 capable of removing a gas G included in the ink I flowing through the flow path 50 are provided. As illustrated in FIG. 1, the flow path unit 100A of the embodiment includes the removal unit 110 in each of the four ink tubes 5 corresponding to black ink, cyan ink, magenta ink, and yellow ink. The four removal units 110 all have the same configuration, and as illustrated in FIGS. 2 and 3, each of the removal units 110 includes an inner wall 112 that is provided with an opening 113 in communication with the flow path 50 and that comes into contact with the ink I, and a storage tank 111 that has the inner wall 112 and stores the ink I, and is configured to be able to remove the gas G contained in the ink I flowing through the flow path 50 in the storage tank 111. The opening 113 includes an opening 113A corresponding to an inlet through which the ink I flows into the storage tank 111 and an opening 113B corresponding to an outlet through which the ink I flows out of the storage tank 111. The storage tank 111 can also be regarded as constituting a part of the flow path 50.

Here, as illustrated in FIGS. 2 and 3, in the flow path unit 100A of the embodiment, the removal unit 110 includes, at a position coming into contact with the ink I in the storage tank 111, a lyophobic member 120 having a lower lyophilic property with respect to the ink I than that of the inner walls 112. In general, as a lyophilic property of a contact surface with respect to the liquid becomes lower, the gas G contained in the liquid is more likely to appear as bubbles GB on the contact surface. Therefore, the flow path unit 100A of the embodiment can cause the gas G contained in the ink I to appropriately appear as the bubbles GB due to the lyophobic member 120. Therefore, the gas contained in the liquid flowing through the flow path 50 can be appropriately removed.

As illustrated in FIGS. 2 and 3, in the flow path unit 100A of the embodiment, the bubbles GB selectively adheres to the lyophobic member 120 that is likely to form bubbles. On the other hand, in a flow path unit 101 of a reference example illustrated in FIG. 11, the lyophobic member 120 is not provided in the storage tank 111. Therefore, in the flow path unit 101 of the reference example, the bubbles GB adhere to the inner wall 112. When the bubbles GB adheres to the inner wall 112, the bubbles GB adheres to a position close to the opening 113 and thus the bubbles GB may enter the ink tube 5 from the opening 113 on the outlet side in the storage tank 111 due to a flow F of the ink I in the storage tank 111 serving as the flow path 50. When the bubbles GB enter the ink tube 5 and reach the ejection unit 3, an ejection failure may occur.

Here, in description from the viewpoint of the liquid ejection device, the liquid ejection device 1 according to the embodiment is a liquid ejection device including the flow path unit 100 having the characteristics described above, the ejection unit 3 that ejects the ink I which is a liquid, and the flow path 50 that supplies the ink I to the ejection unit 3. Therefore, the gas G contained in the ink I can be caused to appropriately appear as the bubbles GB due to the lyophobic member 120, and the gas G contained in the ink I flowing through the flow path 50 can be appropriately removed.

The lyophilic property with respect to the ink I (a liquid) can be evaluated by applying the ink I to a planar surface portion such as the lyophobic member 120 and the inner wall 112 to be evaluated for the lyophilic property and measuring a contact angle of the ink I with respect to the planar surface portion. As the ink I is less likely to wet the planar surface portion to be evaluated for the lyophilic property and the contact angle becomes larger, the ink I becomes lyophobic, and as the ink I is likely to wet the planar surface portion to be evaluated for the lyophilic property and the contact angle becomes smaller, the ink I becomes lyophilic. Specifically, for example, an evaluation for lyophilic property can be performed in accordance with a surface free energy measurement method of JIS R 3257 (1999) using an actually used liquid and an actually used target member to be evaluated for the lyophilic property.

Further, as illustrated in FIG. 3, in the flow path unit 100A of the embodiment, a decompression chamber 131 is provided above the storage tank 111 in the direction of gravity. As illustrated in FIG. 3, the decompression chamber 131 is coupled to a tube 6 coupled to a decompression pump (not illustrated), and is partitioned from the storage tank 111 by a permeable membrane 130 that does not allow liquid to pass therethrough but allows gas to pass therethrough. The decompression pump is an example of a suction mechanism that suctions the gas in the decompression chamber 131. A pressure inside the decompression chamber 131 is lower than a pressure outside the decompression chamber 131, that is, the atmospheric pressure. In other words, the removal unit 110 of the flow path unit 100A according to the embodiment includes, above the lyophobic member 120 in the direction of gravity, the decompression chamber 131 as a recovery unit that recovers the bubbles GB desorbed from the ink I. Therefore, the flow path unit 100A according to the embodiment can suppress the bubbles GB reaching the ink tube 5 as the flow path 50 by recovering the bubbles GB that has appeared due to the lyophobic member 120.

In the flow path unit 100A of the embodiment, the lyophobic member 120 is disposed as illustrated in FIGS. 2 and 3. That is, as illustrated in FIG. 2, a plurality of lyophobic members 120 in the form of a planar plate extending in a direction substantially along the entire transport direction A of the storage tank 111 are formed at different heights substantially in the direction B2 as illustrated in FIG. 3. Additionally, in the storage tank 111, a flow F of the ink I is formed as illustrated in FIGS. 2 and 3. However, the lyophobic member 120 is not limited to such a configuration. The lyophobic members 120 may have a shape and an arrangement that do not obstruct the flow F of the ink I in the storage tank 111.

Embodiment 2

Figure 4:
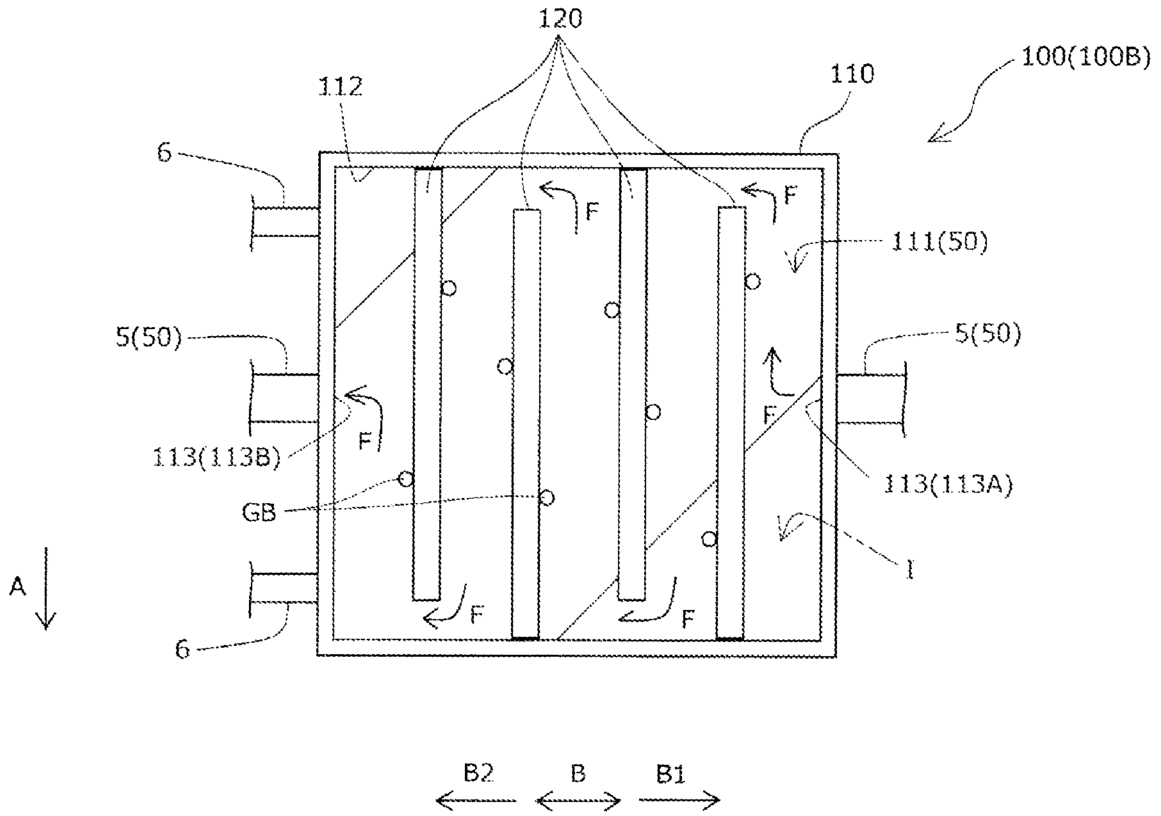
FIG. 4 is a schematic plan cross-sectional view illustrating a removal unit of a flow path unit of a liquid ejection device according to Embodiment 2 of the present disclosure.
Figure 5:
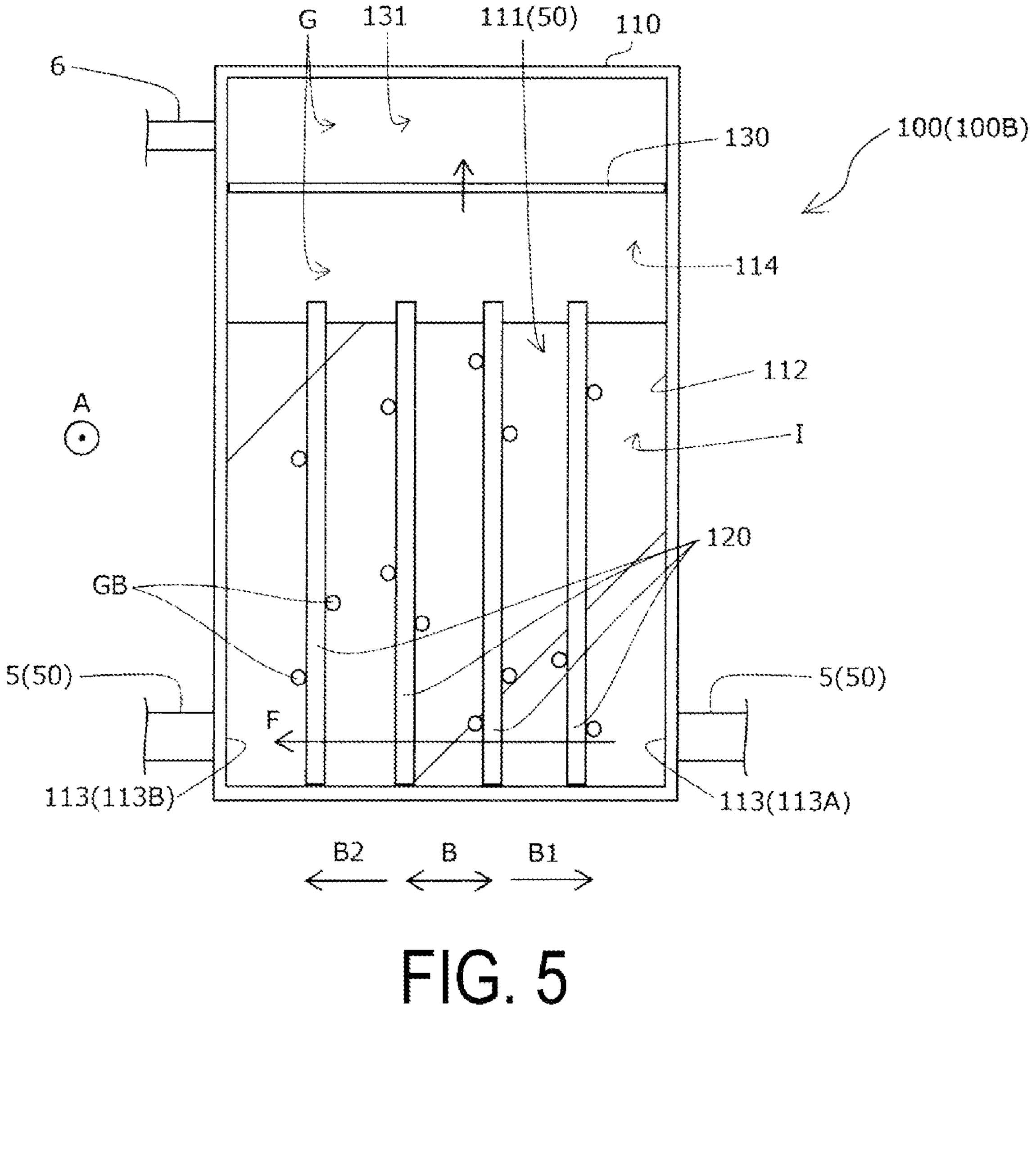
FIG. 5 is a schematic side cross-sectional view illustrating the removal unit of the flow path unit of the liquid ejection device according to Embodiment 2 of the present disclosure.

Hereinafter, a flow path unit 100B of the liquid ejection device according to Embodiment 2 will be described with reference to FIGS. 4 and 5. FIG. 4 is a diagram corresponding to FIG. 2 in the liquid ejection device 1 of Embodiment 1, and FIG. 5 is a diagram corresponding to FIG. 3 in the liquid ejection device 1 of Embodiment 1. Also, the liquid ejection device of the embodiment is the same as the liquid ejection device of Embodiment 1 except for the configuration described below. Specifically, only the configuration of the lyophobic member 120 is different from that in the liquid ejection device according to Embodiment 1. For this reason, the liquid ejection device has the same characteristics as the liquid ejection device of Embodiment 1. Therefore, in FIGS. 4 and 5, the same reference numerals are used to denote the same constituent members as in Embodiment 1, and detailed description thereof will be omitted.

In the flow path unit 100B of the embodiment, as illustrated in FIG. 4, a plurality of lyophobic members 120 each having a planar plate shape and extending in a direction substantially along the transport direction A in plan view are alternately provided in the direction substantially along the transport direction A. Then, as illustrated in FIG. 5, an upper end portion of each of the lyophobic members 120 in the direction of gravity extends to a reservoir portion 114 in the storage tank 111. That is, in the flow path unit 100B of the embodiment, the storage tank 111 includes the reservoir portion 114 on the upper side in the direction of gravity, and the lyophobic member 120 extends to the reservoir portion 114.

When the entire lyophobic member 120 is located in the liquid, the bubbles GB adhering to the lyophobic member 120 easily moves upward in the direction of gravity along the lyophobic member 120, but does not easily separate from the upper end portion of the lyophobic member 120 in the direction of gravity. However, the bubbles GB adhering to the lyophobic member 120 can be efficiently moved to the reservoir portion 114, and the bubbles GB reaching the ink tubes 5 serving as the flow paths 50 can be suppressed by adopting a configuration in which the lyophobic member 120 protrudes into the reservoir portion 114 as in the flow path unit 100B of the embodiment.

Embodiment 3

Figure 6:
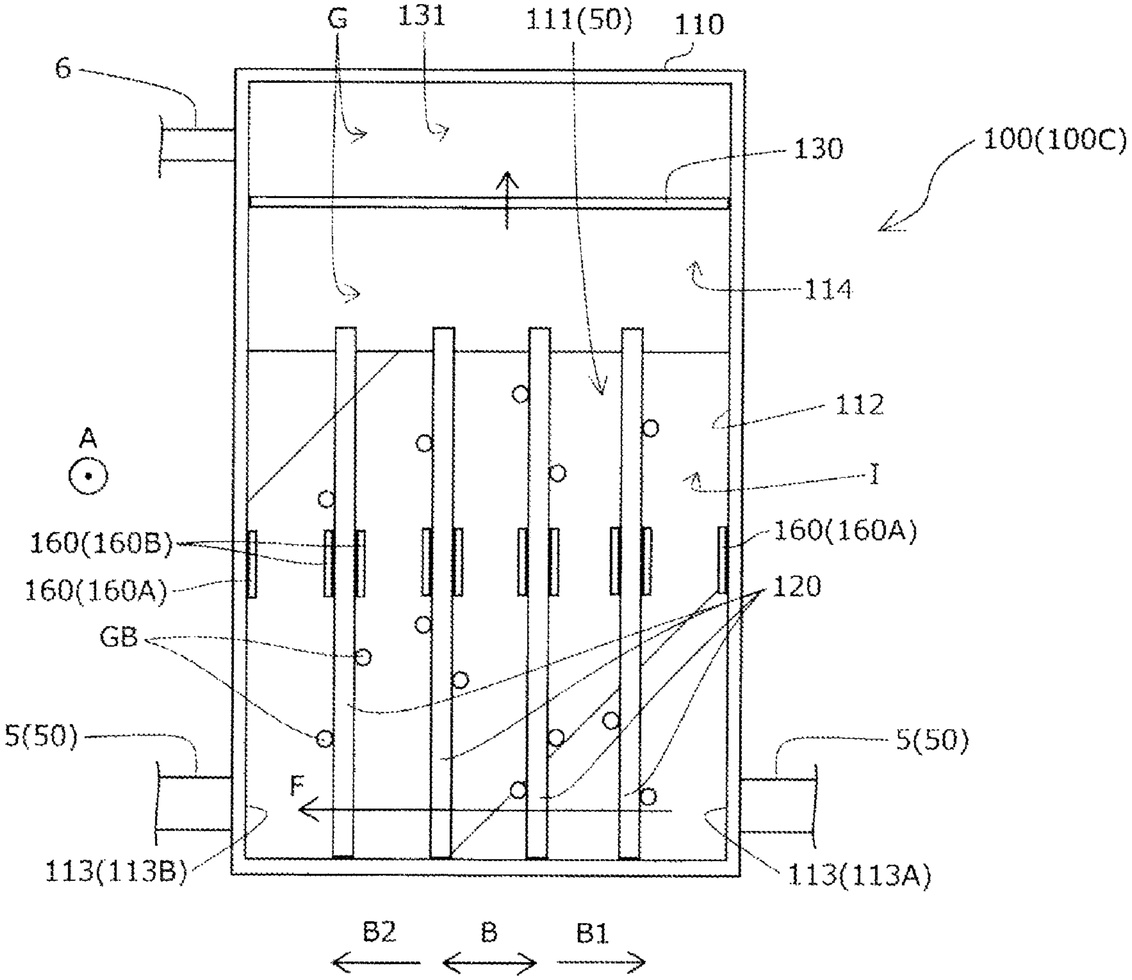
FIG. 6 is a schematic side cross-sectional view illustrating a removal unit of a flow path unit of a liquid ejection device according to Embodiment 3 of the present disclosure.

Hereinafter, a flow path unit 100C of a liquid ejection device according to Embodiment 3 will be described in detail with reference to FIG. 6. FIG. 6 is a diagram corresponding to FIG. 3 in the liquid ejection device 1 according to Embodiment 1. Also, the liquid ejection device of the embodiment is similar to the liquid ejection device of Embodiments 1 and 2 except for the configuration described below. Specifically, the liquid ejection device according to the embodiment is different from the liquid ejection device according to Embodiment 2 only in that a heating unit 160 is provided. For this reason, the liquid ejection device according to the embodiment has the same characteristics as those of the liquid ejection devices according to Embodiments 1 and 2. Therefore, in FIG. 6, the same reference numerals are used for the components common to Embodiments 1 and 2, and detailed description thereof will be omitted.

As illustrated in FIG. 6, the flow path unit 100C of the embodiment includes a heating unit 160 that heats the liquid (the ink I) stored in the storage tank 111. Since the gas G contained in the liquid can be efficiently turned into the bubbles GB by heating the liquid, the flow path unit 100C of the embodiment can efficiently remove the gas G contained in the ink I flowing through the flow path 50. Here, "the liquid stored in the storage tank 111" means not only the liquid stored in the storage tank 111 but also the liquid stored in the storage tank 111 in the future. Therefore, in the embodiment, the heating unit 160 is provided in the storage tank 111, but the heating unit 160 may be provided upstream of the storage tank 111 in a direction in which the liquid flows, that is, in any portion of the flow path 50 at a position between the ink cartridge 4 and the removal unit 110.

More specifically, as illustrated in FIG. 6, in the flow path unit 100C of the embodiment, the removal unit 110 includes a first heating unit 160A provided on the inner wall 112 and a second heating unit 160B provided on the lyophobic member 120 as the heating unit 160. Therefore, the flow path unit 100C according to the embodiment can remove the gas G contained in the ink I particularly efficiently in the storage tank 111.

Embodiment 4

Figure 7:
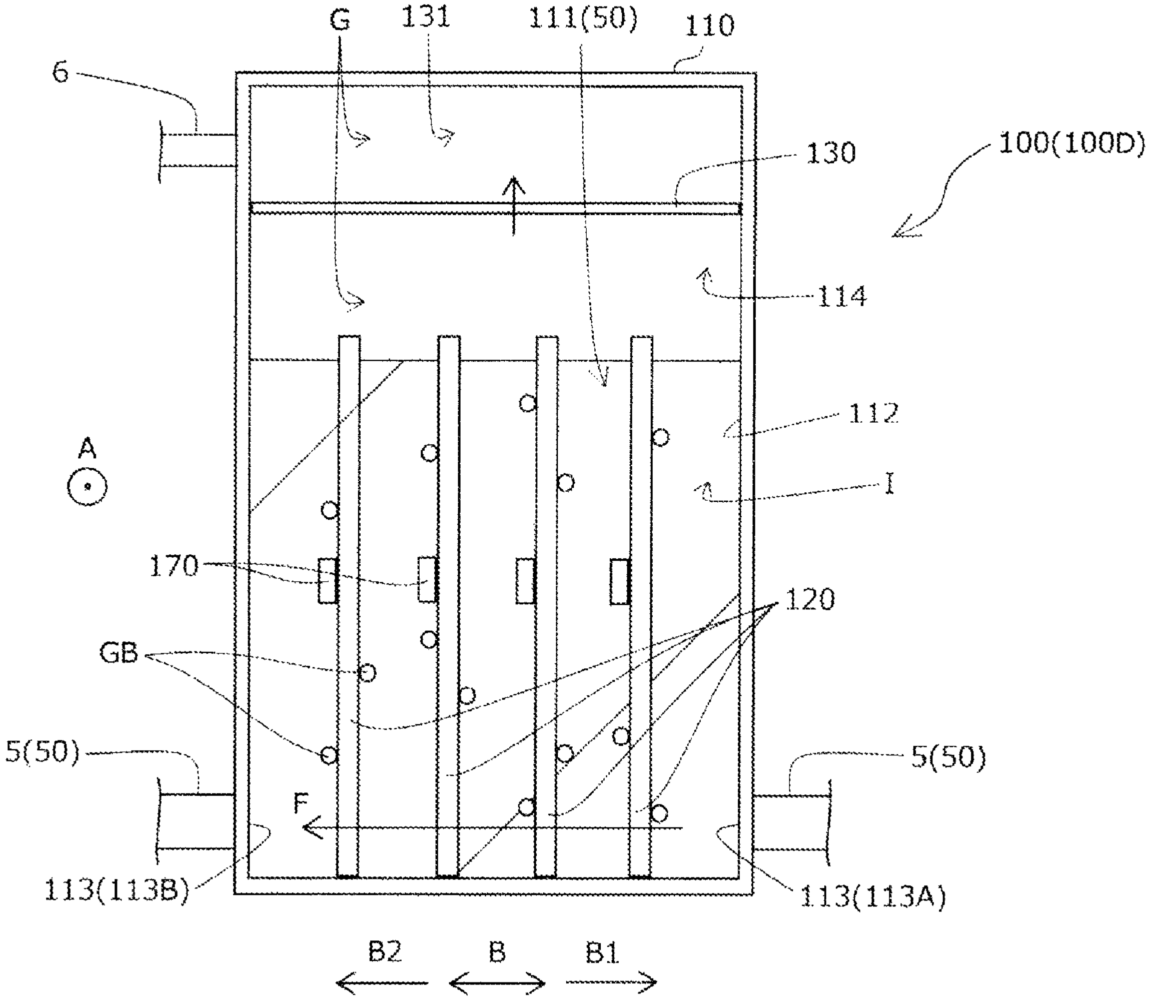
FIG. 7 is a schematic side cross-sectional view illustrating a removal unit of a flow path unit of a liquid ejection device according to Embodiment 4 of the present disclosure.

Hereinafter, a flow path unit 100D of a liquid ejection device according to Embodiment 4 will be described in detail with reference to FIG. 7. FIG. 7 is a diagram corresponding to FIG. 3 in the liquid ejection device 1 according to Embodiment 1. Also, the liquid ejection device of the embodiment is similar to the liquid ejection devices of Embodiments 1 to 3 except for the configuration described below. Specifically, the liquid ejection device according to the embodiment is different from the liquid ejection device according to Embodiment 2 only in that the heating unit 160 is provided. For this reason, the liquid has the same characteristics as those of the liquid ejection devices according to Embodiments 1 to 3. Therefore, in FIG. 7, the same reference numerals are used for the constituent members common to Embodiments 1 to 3, and detailed description thereof will be omitted.

As illustrated in FIG. 7, the flow path unit 100D of the embodiment includes an ultrasonic wave applying unit 170 that applies ultrasonic waves to the ink I stored in the storage tank 111. Since the gas G contained in the liquid can be efficiently turned into the bubbles GB by applying ultrasonic waves to the liquid, the flow path unit 100D of the embodiment can efficiently remove the gas G contained in the ink I flowing through the flow path 50.

More specifically, as illustrated in FIG. 7, in the flow path unit 100D of the embodiment, the ultrasonic wave applying unit 170 is provided on the lyophobic member 120. Therefore, the flow path unit 100D according to the embodiment can remove the gas G contained in the ink I particularly efficiently in the storage tank 111. However, the present disclosure is not limited to such a configuration. The ultrasonic wave applying unit 170 may be provided on the inner wall 112, or may be provided in any portion of the flow path 50 at a position between the ink cartridge 4 and the removal unit 110.

Embodiment 5

Figure 8:
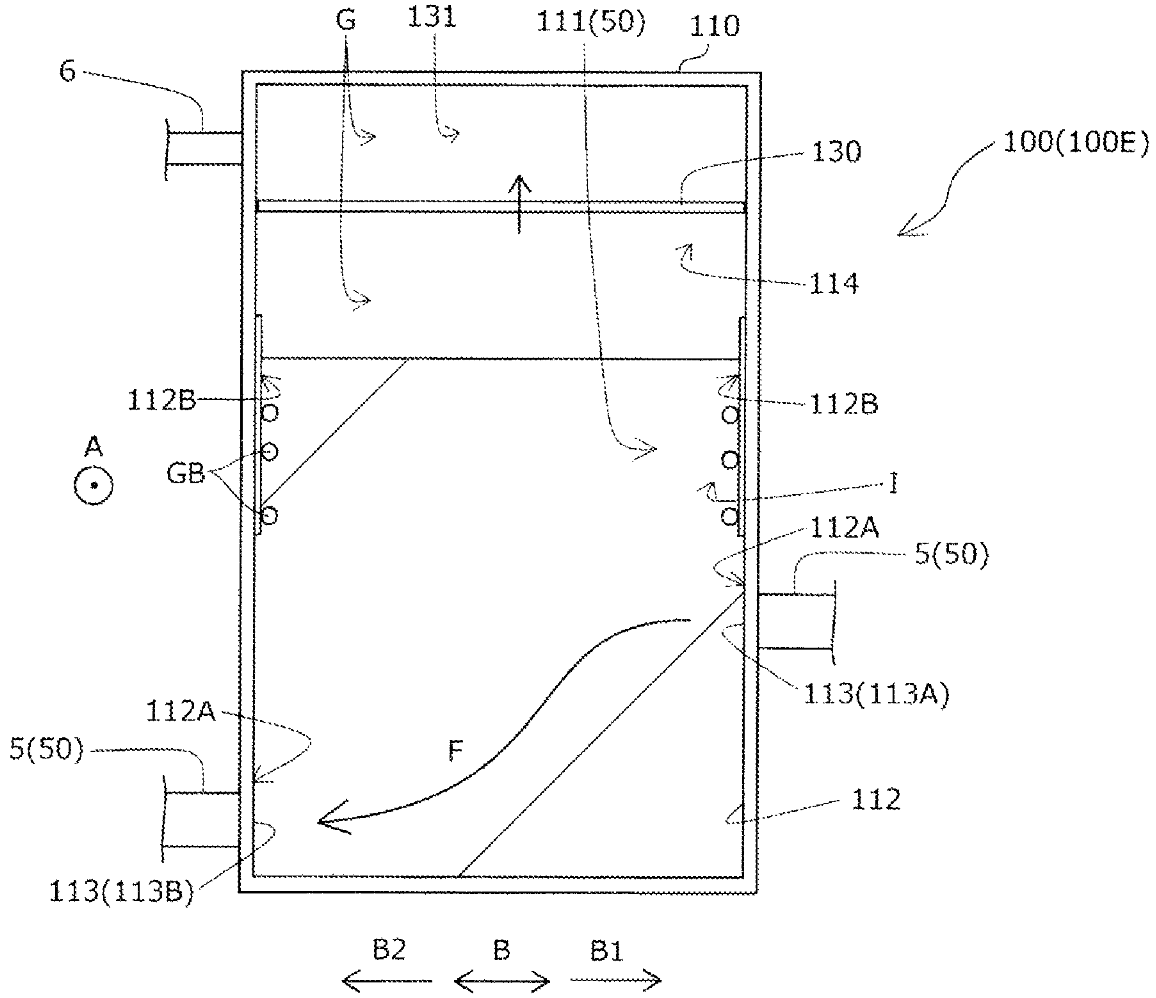
FIG. 8 is a schematic side cross-sectional view illustrating a removal unit of a flow path unit of a liquid ejection device according to Embodiment 5 of the present disclosure.

Hereinafter, a flow path unit 100E of a liquid ejection device according to Embodiment 5 will be described in detail with reference to FIG. 8. FIG. 8 is a diagram corresponding to FIG. 3 in the liquid ejection device 1 according to Embodiment 1. Also, the liquid ejection device of the embodiment is the same as the liquid ejection devices of Embodiments 1 to 4 except for the configuration described below. For this reason, the liquid has the same characteristics as those of the liquid ejection devices according to Embodiments 1 to 4. Therefore, in FIG. 8, the same reference numerals are used for the constituent members that are common to Embodiments 1 to 4, and detailed description thereof will be omitted.

As described above, in the liquid ejection devices according to Embodiments 1 to 4, the storage tank 111 includes the lyophobic member 120. On the other hand, in the liquid ejection device of the embodiment, as illustrated in FIG. 8, the storage tank 111 does not include the lyophobic member 120, and instead, a lyophobic region 112B is provided on the inner walls 112 by roughening a surface by, for example, UV irradiation. However, the method of forming the lyophobic region 112B is not particularly limited. In addition, in FIG. 8 and the like, a formation region of the lyophobic region 112B is illustrated in a state in which it is raised with respect to the inner wall 112 so as to be easily understood, but is actually formed to be substantially flush with other regions of the inner wall 112. Further, in the embodiment, the lyophobic region 112B is continuously formed so as to go around the inner wall 112 in plan view.

Here, the flow path unit 100E of the embodiment is a flow path unit that supplies the ink I to the ejection unit 3 that ejects the ink I that is a liquid, as in the liquid ejection devices of Embodiments 1 to 4, and includes a flow path 50 through which the ink I flows. Further, the flow path unit 100E of the embodiment includes an inner wall 112 that is provided with the opening 113 in communication with the flow paths 50 and that comes into contact with the ink I, the storage tank 111 that stores the ink I, and the removal unit 110 which can remove the gas G contained in the ink I flowing through the flow paths 50 in the storage tank 111, similarly to the liquid ejection devices of Embodiments 1 to 4. However, unlike the liquid ejection devices of Embodiments 1 to 4, the flow path unit 100E of the embodiment does not include the lyophobic member 120 in the storage tank 111, and instead, as illustrated in FIG. 8, the inner wall 112 includes, at a position coming into contact with the ink I in the storage tank 111, a lyophobic region 112A having a lower lyophilic property with respect to the ink I than that of an adjacent region 112B adjacent to the opening 113.

As described above, in a flow path unit 100E of the embodiment, the inner wall 112 includes, at a position coming into contact with the liquid in the storage tank 111, the lyophobic region 112A that has a lower lyophilic property with respect to the liquid (the ink I) than that of the adjacent region 112B. Since the gas G contained in the liquid is more likely to appear as the bubbles GB on a contact surface as the lyophilic property of the contact surface with respect to the liquid decreases, the flow path unit 100E of the embodiment can cause the gas G contained in the ink I to appropriately appear as the bubbles GB due to the lyophobic region 112B. Therefore, the flow path unit 100E of the embodiment can appropriately remove the gas G contained in the ink I flowing through the flow path 50. Examples of "including, at a position coming into contact with the liquid in the storage tank 111, a lyophobic region 112A having a lower lyophilic property with respect to the liquid than that of the adjacent region 112B" may include providing one lyophobic region 112B at a position different from that of the adjacent region 112A as in the embodiment, providing a plurality of lyophobic regions 112B at positions different from the adjacent region 112A, and forming the inner wall 112 such that the lyophilic property with respect to the liquid decreases with a distance from the opening 113.

Here, in description from the viewpoint of the liquid ejection device, the liquid ejection device 1 according to the embodiment is a liquid ejection device including the flow path unit 100 having the characteristics described above, the ejection unit 3 that ejects the ink I which is a liquid, and the flow path 50 that supplies the ink I to the ejection unit 3. Therefore, the gas G contained in the ink I can be appropriately caused to appear as the bubbles GB due to the lyophobic member 120, and the gas G contained in the ink I flowing through the flow path 50 can be appropriately removed.

In addition, as illustrated in FIG. 8, in the flow path unit 100E according to the embodiment, the removal unit 110 includes, above the lyophobic region 112B in the direction of gravity, a decompression chamber 131 as a recovery unit that recovers the bubbles GB desorbed from the ink I. Therefore, the flow path unit 100E according to the embodiment can suppress the bubbles GB reaching the ink tubes 5 as the flow paths 50 by recovering the bubbles GB that have appeared in the lyophobic region 112B. The decompression chamber 131 of the flow path unit 100E according to the embodiment has the same configuration as those of the decompression chambers 131 of the liquid ejection devices according to Embodiments 1 to 4, but the configuration of the recovery unit is not particularly limited.

In addition, as illustrated in FIG. 8, in the flow path unit 100E of the embodiment, the storage tank 111 stores the ink I in a state of including the reservoir portion 114 on the upper side in the direction of gravity, and the lyophobic region 112B is provided over a gas-liquid interface with the reservoir portion 114. When the entire lyophobic region 112B is located in the liquid, the bubbles GB adhering to the lyophobic region 112B is likely to move upward in the direction of gravity along the lyophobic region 112B, but is unlikely to be separated from an upper end portion of the lyophobic region 112B in the direction of gravity. On the other hand, as illustrated in FIG. 8, the bubbles GB adhering to the lyophobic region 112B can be efficiently moved to the reservoir portion 114, and the bubbles GB reaching the ink tube 5 as the flow path 50 can be suppressed by adopting a configuration in which the lyophobic region 112B is provided over the interface between the ink I stored in the storage tank 111 and the gas G stored in the reservoir portion 114.

As illustrated in FIG. 8, in the flow path unit 100E of the embodiment, an opening 113A is provided on the upper side in the direction of gravity and an opening 113B is provided on the lower side in the direction of gravity so that the flow F of the ink I in the storage tank 111 is directed from the upper side to the lower side in the direction of gravity in side view. With such a configuration, it is possible to suppress the bubble GB reaching the ink tube 5 as the flow path 50 via at least one of the opening 113A and the opening 113B. However, the present disclosure is not limited such a configuration.

Embodiment 6

Figure 9:
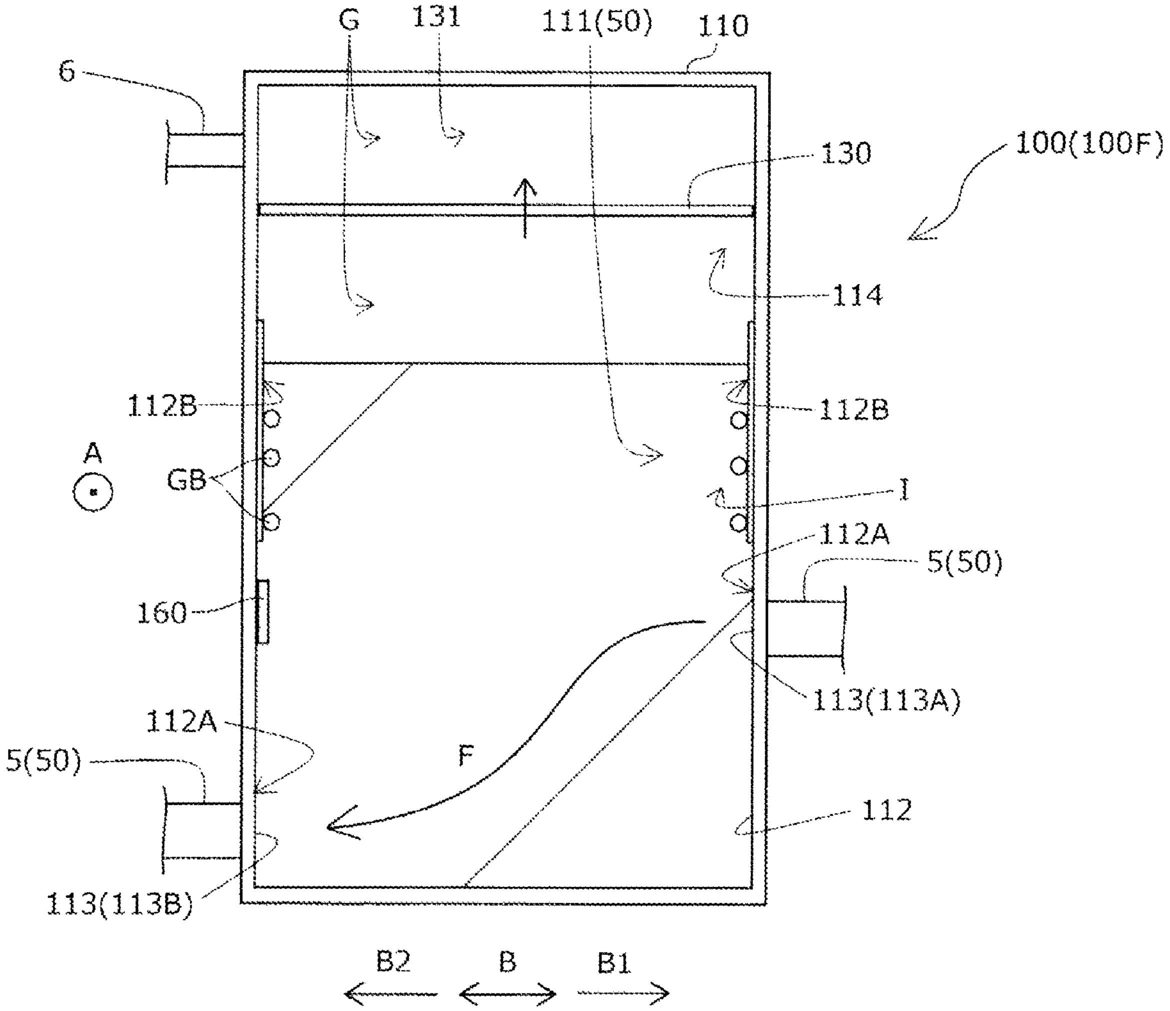
FIG. 9 is a schematic side cross-sectional view illustrating a removal unit of a flow path unit of a liquid ejection device according to Embodiment 6 of the present disclosure.

Hereinafter, a flow path unit 100F of a liquid ejection device according to Embodiment 6 will be described in detail with reference to FIG. 9. FIG. 9 is a diagram corresponding to FIG. 3 in the liquid ejection device 1 according to Embodiment 1. Also, the liquid ejection device of the embodiment is the same as the liquid ejection devices of Embodiments 1 to 5 except for the configuration described below. Specifically, the liquid ejection device according to the embodiment is different from the liquid ejection device according to Embodiment 5 only in that a heating unit 160 is provided. For this reason, the liquid ejection device according to the embodiment has the same characteristics as those of the liquid ejection devices according to Embodiments 1 to 5. Therefore, in FIG. 9, the same reference numerals are used for the constituent members common to Embodiments 1 to 5, and detailed description thereof will be omitted.

As illustrated in FIG. 9, the flow path unit 100F of the embodiment includes the heating unit 160 that heats the ink I stored in the storage tank 111. Since the gas G contained in the liquid can be efficiently turned into the bubbles GB by heating the liquid, the flow path unit 100F of the embodiment can efficiently remove the gas G contained in the ink I flowing through the flow path 50. However, the present disclosure is not limited to such a configuration, and the heating unit 160 may be provided in any portion of the flow path 50 at a position between the ink cartridge 4 and the removal unit 110.

Embodiment 7

Figure 10:
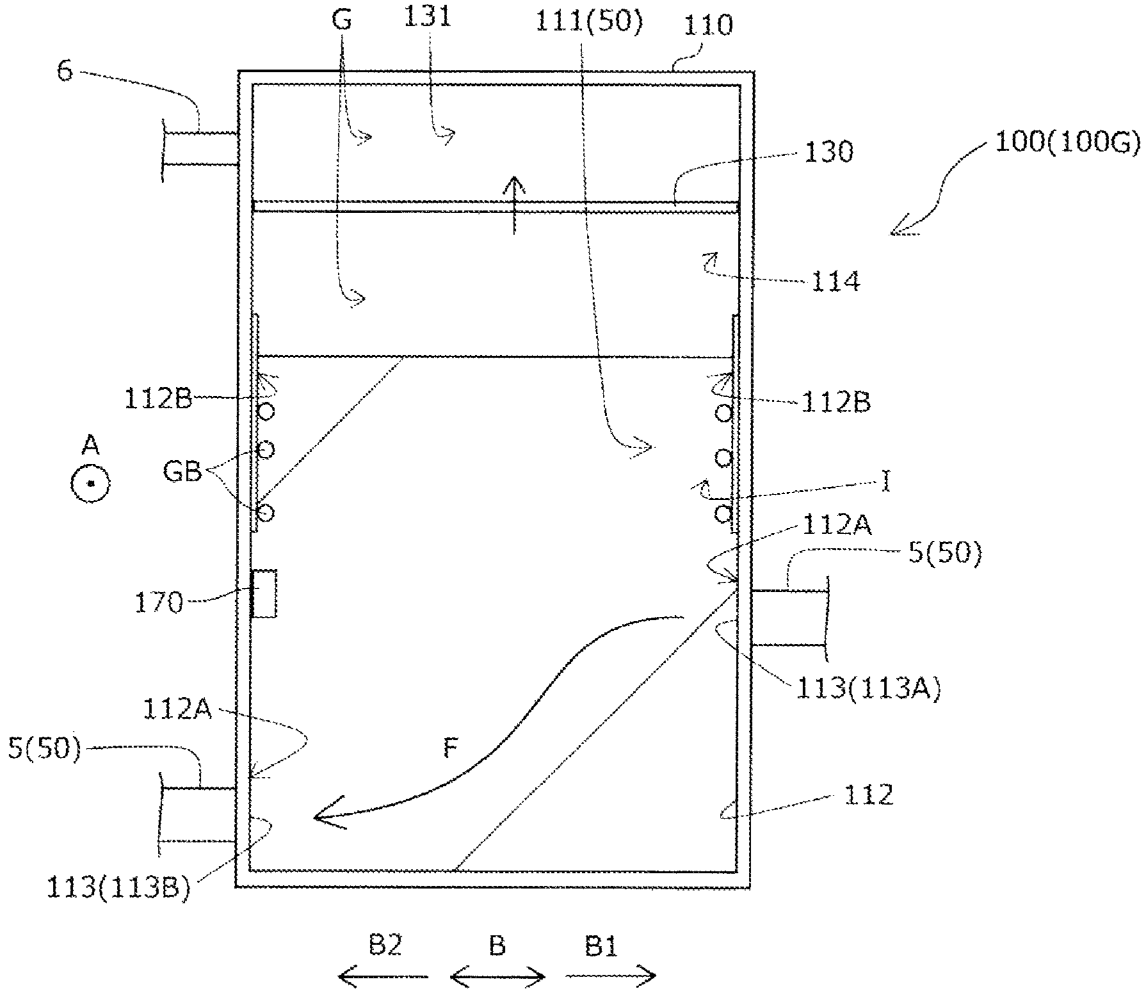
FIG. 10 is a schematic side cross-sectional view illustrating a removal unit of a flow path unit of a liquid ejection device according to Embodiment 7 of the present disclosure.

Hereinafter, a flow path unit 100G of a liquid ejection device according to Embodiment 7 will be described with reference to FIG. 10. FIG. 10 is a diagram corresponding to FIG. 3 in the liquid ejection device 1 according to Embodiment 1. Also, the liquid ejection device of the embodiment is the same as the liquid ejection devices of Embodiments 1 to 6 except for the configuration described below. Specifically, the liquid ejection device according to the embodiment is different from the liquid ejection device according to Embodiment 5 only in that an ultrasonic wave applying unit 170 is provided at the liquid ejection device according to Embodiment 5. For this reason, the liquid has the same characteristics as those of the liquid ejection devices according to Embodiments 1 to 6. Therefore, in FIG. 10, the same reference numerals are used for the constituent members common to Embodiments 1 to 6, and detailed description thereof will be omitted.

As illustrated in FIG. 10, a flow path unit 100G of the embodiment includes an ultrasonic wave applying unit 170 that applies ultrasonic waves to the ink I stored in the storage tank 111. Since the gas G contained in the liquid can be efficiently turned into the bubbles GB by applying ultrasonic waves to the liquid, the flow path unit 100G of the embodiment can efficiently remove the gas G contained in the ink I flowing through the flow path 50. However, the present disclosure is not limited to such a configuration, and the ultrasonic wave applying unit 170 may be provided in any portion of the flow path 50 at a position between the ink cartridge 4 and the removal unit 110.

The present disclosure is not limited to the above embodiments, and various modifications are possible within the scope of the disclosure described in the claims, and these modifications are also included in the scope of the present disclosure.

What is claimed is:

1. A flow path unit including a flow path through which a liquid supplied to an ejection unit that ejects the liquid flows, the flow path unit comprising a removal unit configured to remove a gas contained in the liquid flowing through the flow path, wherein the removal unit includes:

an inner wall that is provided with an opening in communication with the flow path and that is configured to come into contact with the liquid and a storage tank including the inner wall and configured to store the liquid, the removal unit removes the gas in the storage tank, the removal unit includes, at a position coming into contact with the liquid in the storage tank, a lyophobic member having a lower lyophilic property with respect to the liquid than that of the inner wall, the lyophobic member being in the form of a planar plate that extends into the storage tank, the storage tank includes, on an upper side in a direction of gravity, a reservoir portion in which the gas removed from the liquid is accumulated, and the lyophobic member extends to the reservoir portion.

2. The flow path unit according to claim 1, wherein the removal unit includes, above the lyophobic member in a direction of gravity, a recovery unit configured to recover a bubble desorbed from the liquid.

3. The flow path unit according to claim 1, further comprising at least one heating unit configured to heat the liquid stored in the storage tank.

4. The flow path unit according to claim 3, wherein the at least one heating unit includes a first heating unit provided at the inner wall and a second heating unit provided at the lyophobic member.

5. The flow path unit according to claim 1, further comprising an ultrasonic wave applying unit configured to apply an ultrasonic wave to the liquid stored in the storage tank.

6. The flow path unit according to claim 5, wherein the ultrasonic wave applying unit is provided at the lyophobic member.

7. A liquid ejection device including an ejection unit configured to eject a liquid, and a flow path through which the liquid supplied to the ejection unit flows, the liquid ejection device comprising a removal unit configured to remove a gas contained in the liquid flowing through the flow path, wherein the removal unit includes:

an inner wall that is provided with an opening in communication with the flow path and that is configured to come into contact with the liquid and a storage tank including the inner wall and configured to store the liquid, the removal unit removes the gas in the storage tank, the removal unit includes, at a position coming into contact with the liquid in the storage tank, a lyophobic member having a lower lyophilic property with respect to the liquid than that of the inner wall, the lyophobic member being in the form of a planar plate that extends into the storage tank, the storage tank includes, on an upper side in a direction of gravity, a reservoir portion in which the gas removed from the liquid is accumulated, and the lyophobic member extends to the reservoir portion.

8. A flow path unit including a flow path through which a liquid supplied to an ejection unit that ejects the liquid flows, the flow path unit comprising a removal unit configured to remove a gas contained in the liquid flowing through the flow path, wherein the removal unit includes:

an inner wall that is provided with an opening in communication with the flow path and that is configured to come into contact with the liquid, a storage tank including the inner wall and configured to store the liquid, and at least one heating unit configured to heat the liquid stored in the storage tank, the removal unit removes the gas in the storage tank, the removal unit includes, at a position coming into contact with the liquid in the storage tank, a lyophobic member having a lower lyophilic property with respect to the liquid than that of the inner wall, and the at least one heating unit includes a first heating unit provided at the inner wall and a second heating unit provided at the lyophobic member.

9. A flow path unit including a flow path through which a liquid supplied to an ejection unit that ejects the liquid flows, the flow path unit comprising a removal unit configured to remove a gas contained in the liquid flowing through the flow path, wherein the removal unit includes:

an inner wall that is provided with an opening in communication with the flow path and that is configured to come into contact with the liquid, a storage tank including the inner wall and configured to store the liquid, and an ultrasonic wave applying unit configured to apply an ultrasonic wave to the liquid stored in the storage tank, the removal unit removes the gas in the storage tank, the removal unit includes, at a position coming into contact with the liquid in the storage tank, a lyophobic member having a lower lyophilic property with respect to the liquid than that of the inner wall, and the ultrasonic wave applying unit is provided at the lyophobic member.

* * * * *